United States Patent [19]

I et al.

[11] Patent Number: 6,088,335

[45] Date of Patent: *Jul. 11, 2000

[54] CODE DIVISION MULTIPLE ACCESS SYSTEM PROVIDING LOAD AND INTERFERENCE BASED DEMAND ASSIGNMENT SERVICE TO USERS

[75] Inventors: Chih-Lin I, Manalapan Township, Monmouth County; Sarath Kumar, Eatontown Township, Monmouth County; Sanjiv Nanda, Plainsboro Township, Middlesex County, all of N.J.

[73] Assignee: Lucent Technologies Inc., Murray Hill, N.J.

[ * ] Notice: This patent is subject to a terminal disclaimer.

[21] Appl. No.: 08/837,588

[22] Filed: Apr. 21, 1997

Related U.S. Application Data

[63] Continuation-in-part of application No. 08/539,476, Oct. 5, 1995, Pat. No. 5,734,646.

[51] Int. Cl.[7] .................................................. H04B 7/216
[52] U.S. Cl. ........................ 370/252; 370/335; 370/441; 370/468; 370/479; 375/130; 455/452
[58] Field of Search .................................. 370/335, 328, 370/329, 342, 310, 313, 431, 437, 441, 464, 465, 479, 491, 500, 468, 252; 455/422, 436, 437, 439, 440, 442, 445, 450, 451, 452, 454, 524, 525, 69; 375/200

[56] References Cited

U.S. PATENT DOCUMENTS

| | | | |
|---|---|---|---|
| 5,161,154 | 11/1992 | Diaz et al. | 370/341 |
| 5,313,461 | 5/1994 | Ahl et al. | 370/349 |
| 5,367,533 | 11/1994 | Schilling | 370/342 |
| 5,442,625 | 8/1995 | Gitlin et al. | 370/342 |
| 5,455,821 | 10/1995 | Schaeffer et al. | 370/332 |
| 5,487,174 | 1/1996 | Persson | 379/60 |
| 5,490,136 | 2/1996 | Sereno et al. | 370/342 |
| 5,495,483 | 2/1996 | Grube et al. | 370/431 |
| 5,530,917 | 6/1996 | Andersson et al. | 455/34.1 |
| 5,551,064 | 8/1996 | Nobbe et al. | 455/34.1 |
| 5,592,469 | 1/1997 | Szabo | 370/468 |
| 5,592,470 | 1/1997 | Rudraopatna et al. | 370/468 |
| 5,598,416 | 1/1997 | Yamada et al. | 370/468 |
| 5,613,198 | 3/1997 | Ahmadi et al. | 455/452 |
| 5,619,492 | 4/1997 | Press et al. | 370/441 |
| 5,734,646 | 3/1998 | I et al. | 370/335 |

*Primary Examiner*—Seema S. Rao

[57] ABSTRACT

A code division multiple access system provides a way of allocating an increased data rate to a requesting mobile station. A mobile station requesting a data rate in excess of the basic data rate sends received pilot strength data for its base station and base stations in adjacent cells. The received pilot strength data is used to determine an increased data rate to be assigned to the requesting mobile station. One feature assigns an increased data rate based on the difference in the maximum received received pilot strength data from a non-active base station (one not in connection with the mobile station) and the maximum received pilot strength data from an active base station (one in connection with the mobile station). Yet another feature utilizes a series of threshold levels, each pair of levels associated with a different permitted data rate. Using the received pilot strength data, a data rate is determined which satisfies all adjacent cell interference concerns. Another feature uses average adjacent cell capacity loads rather than threshold levels, together with the received pilot strength data, to determine the appropriate increased data rate to be assigned to a user requesting an increased data rate.

22 Claims, 10 Drawing Sheets

CODE DIVISION MULTIPLE ACCESS SYSTEM PROVIDING LOAD AND INTERFERENCE BASED DEMAND ASSIGNMENT SERVICE TO USERS

REFERENCE TO PARENT APPLICATION

This is a continuation-in-part of application Ser. No. 08/539,476, filed Oct. 5, 1995, now U.S. Pat. No. 5,734,646.

TECHNICAL FIELD OF THE INVENTION

This invention relates to code division multiple access (CDMA) systems and, more particularly, to a CDMA system for allocating data rate to a user based on the load and interference of the system.

BACKGROUND OF THE INVENTION

The advantages of code division multiple access (CDMA) for cellular voice have become well known. In contrast to orthogonal systems such as time division multiplex access (TDMA) or frequency division multiplex access (FDMA), frequency planning or "orthogonality" coordination (channel allocation) between cells and within the same cell are greatly simplified. The reason is that, unlike TDMA and FDMA where the re-use constraints must account for the worst case (or 95th percentile) interferer, re-use in CDMA is based on the average interference seen from a large number of low power users. Due to this interference averaging property, CDMA simply translates voice activity factor and antenna sectorization into capacity gains. Furthermore, RAKE receivers resolve the multipath components of the spread spectrum signal and translate it into diversity gain.

In spite of the advantages, conventional CDMA systems have very limited per user throughput and are not well suited to "bandwidth on demand" local area network (LAN)-like applications. In fact, current CDMA standards operate in circuit mode, assume a homogeneous user population, and limit each user to a rate which is a small fraction of the system capacity. As mentioned above, CDMA relies on the averaging effect of the interference from a large number of low-rate (voice or circuit-mode data) users. It relies heavily on sophisticated power control to ensure that the average interference from all users from an adjacent cell is a small fraction of the interference from the users within a cell. The imperfect power control in a homogeneous system has a direct impact on system performance.

Moreover, even with perfect power control, users at higher data rates in a system with mixed traffic result in large adjacent cell interference variations which drastically degrade the system capacity. This problem has so far precluded the provision of high data rate services in cellular CDMA.

SUMMARY OF THE INVENTION

Our inventive Load and Interference based Demand Assignment (LIDA) techniques protect voice (and other high priority or delay sensitive) isochronous users while accommodating the peak data rate needs of high data rate users when the load on the system permits. More particularly, our method and apparatus provides a code division multiple access system including a plurality of cells, each cell having a base station and multiple mobile stations, with a way of allocating an increased data rate to a requesting mobile station. Initially, the system receives a data burst request from a mobile station that has an established high burst rate data call in a first cell requesting a data rate in excess of the basic data rate B allocated to that mobile station. The data burst request includes pilot strength information (e.g., pilot measurement report message of IS-95) for a base station of the first cell and at least one cell adjacent to the first cell. Assuming a known level of load in the first cell, an access controller uses the received pilot strength to determine if an increased data rate is to be granted to the requesting mobile station. If granted, a data burst assignment response is transmitted from the access controller the requesting mobile station. One feature enables the access controller to compare the received pilot strength with a threshold (e.g., an interference level indicator). When the received pilot strength has a predetermined relationship to the threshold, the data burst assignment response indicates an increased data rate has been granted to the requesting mobile station. When a plurality of adjacent cells (also referred to herein as neighbor cells) exists, the increased data rate is at the requested first data rate when the pilot strengths received from all of the base stations at the plurality of adjacent cells do not exceed the threshold.

Another system feature enables increasing the data rate assigned to said requesting mobile station as a function of a difference between the maximum received pilot strength information from a non-active base station (one not in connection with the mobile station) and the maximum received pilot strength information from an active base station (one in connection with the mobile station).

Yet another feature utilizes a series of threshold levels, each associated with a different permitted data rate. Using the received pilot strength information, a data rate is determined which satisfies all adjacent cell interference constraints. According to another feature, average adjacent cell loads are utilized rather than threshold levels, together with the pilot strength information, to determine the appropriate increased data rate to be assigned to a user requesting an increased data rate.

GENERAL DESCRIPTION

To curtail the potentially large interference variation in cellular CDMA systems serving mixed traffic, the present invention incorporates autonomous and/or coordinated network access control that accounts for channel loading and interference. It dynamically assigns higher data rates to users while simultaneously adjusting the Quality of Service (QOS) for each user according to service requirements. Higher data rates are assigned to users by either permitting users to transmit on multiple channels simultaneously or by using other means, such as variable spreading gains, variable channel coding rate, variable chip rate, varying the modulation (Walsh modulation, coded modulations, BPSK, QPSK . . . ) etc. An elegant scheme that achieves this is Multi-Code CDMA (MC-CDMA) with dynamic demand assignment, described in U.S. Pat. No. 5,442,625 entitled "Code Division Multiple Access System Providing Variable Data Rate Access" which issued on Aug. 15, 1995 to Richard D. Gitlin and Chih-Lin I. The QOS is adjusted through the power control with a target Frame Error Rate (FER) and signal to interference ratio ($E_b/N_0$) on the channel. In this invention, the network uses a control strategy that accounts for channel loading, interference, and soft handoff in making the rate assignment and QOS decisions. It ensures priority for voice users, if so desired. Thus, dynamic, packet-like demand-assigned access enables users with different services to access the channel at desired rates and QOS requirements.

Our autonomous network access control is referred to herein as the Load and Interference Based Demand Assignment (LIDA) for providing dynamic demand-assigned burst access in a wireless CDMA network. LIDA ensures protection of voice (and other high priority or delay sensitive) isochronous users, but allows peak rate access by high data rate users when the load on the channel permits. With best-effort type QOS guarantees, the high data rate service is best suited for typical LAN- and Wide Area Network WAN-type computer applications (including services based on mobile IP (as discussed by C. Perkins in "IP Mobility Support," *Internet Engineering Task Force*, Mar. 21, 1995) and CDPD ("Cellular Digital Packet Data System Specification: Release 1.1," *CDPD Forum, Inc.*, Jan. 19, 1995)), less so for high rate applications with stringent real time constraints.

DETAILED DESCRIPTION

In the following description, each item or block of each figure has a reference designation associated therewith, the first number of which refers to the figure in which that item is first located (e.g., 110 is located in FIG. 1).

Figure 1:
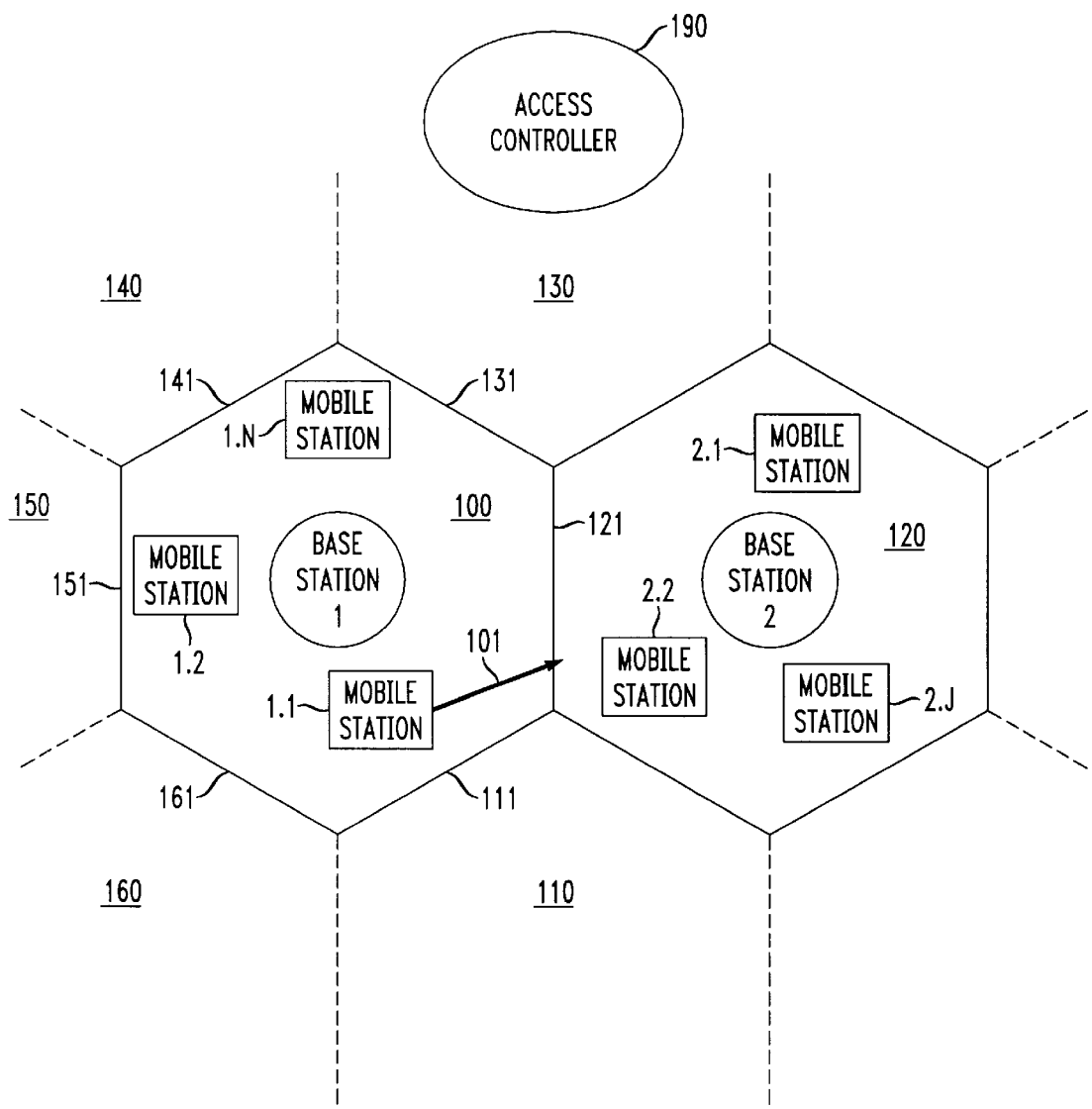
FIG. 1 shows a prior art CDMA system in which the present invention may be utilized.

With reference to FIG. 1, we describe a prior art multicode (MC) CDMA system. The illustrative MC-CDMA system includes a regular hexagonal grid of cell sites 100, 110, 120, 130, 140, 150 and 160, each including a plurality of mobile stations (e.g, MS1.1–MS1.N) which enables each of a plurality of users (1–N) to communicate with its associated base station BS1 within a cell site. Illustratively, cell site 120 includes base station BS2 and mobile stations MS2.1–MS2.J.

Our LIDA control, as will be described in a later paragraph, may be implemented in each base station, e.g., BS1–BS2, etc. In one embodiment of the present invention, an access controller 190 is utilized to provide coordinated access control (FIG. 1) between neighboring base stations (e.g., between BS1 and BS2). In such an arrangement, access controller 190 communicates with all of the base stations to control the assignment of a higher-than-basic data rate and burst length. While the access controller 190 is shown in a separate location, it may be co-located with a base station or the central switch.

Radio distance is the effective radio loss that a signal, transmitted from a base station, incurs in transit to a mobile station. The received pilot power Pi at a mobile station is then $P/z_i$, where P is the transmitted pilot power from each base station and $z_i$ is the effective "radio distance." As a mobile station MS1.1 in cell 100 approaches cell 120, the power level of the received pilot from base station BS2 increases beyond a threshold, $T_{add}$, and the mobile station will enter "soft handoff." During soft handoff, the mobile station communicates with both base stations BS1 and BS2. We extend the use of the pilot measurement to burst access control in this invention.

Figure 2:
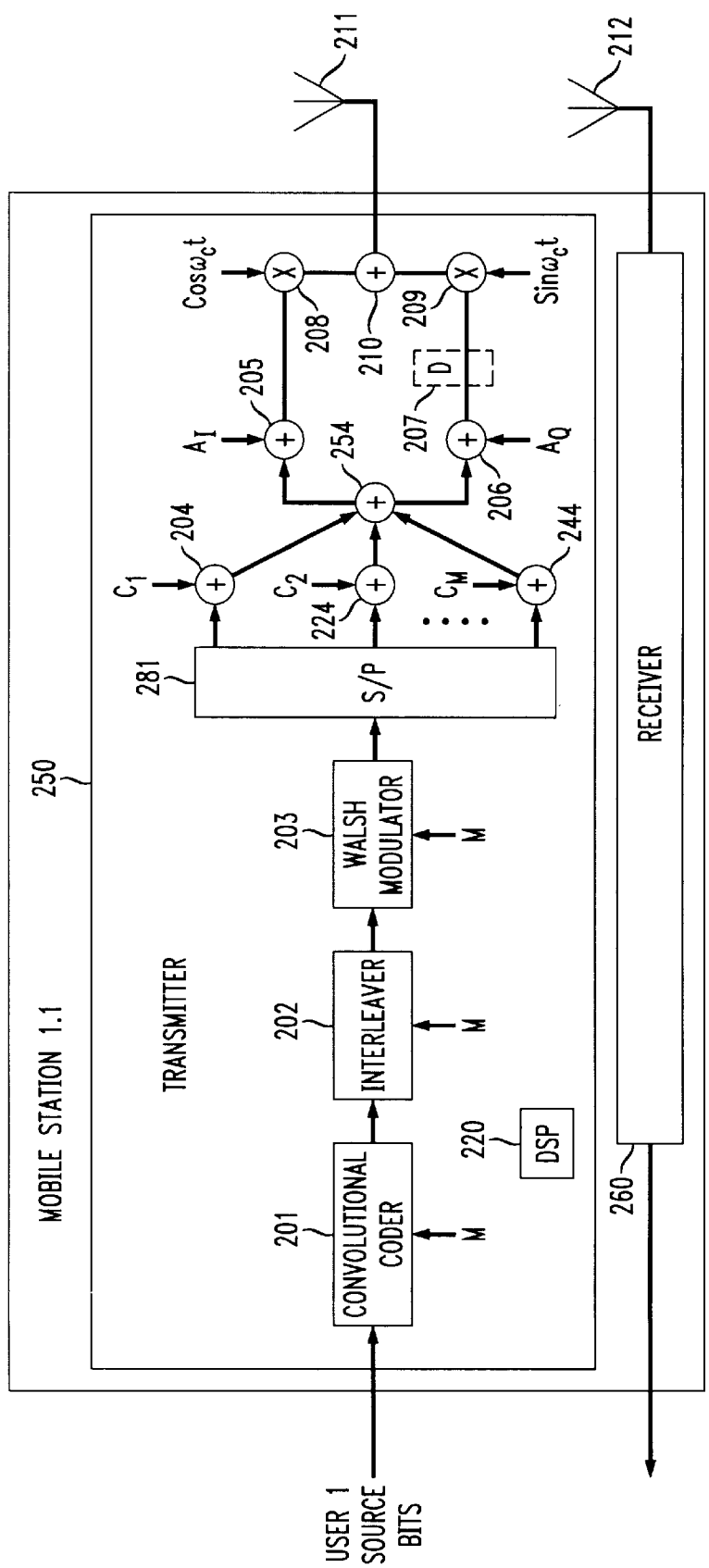
FIG. 2 shows a block diagram of an illustrative mobile station of the CDMA system of FIG. 1.

With reference to FIG. 2, an illustrative block diagram of mobile station MS1.1 is shown to include a transmitter station 250 and a receiver station 260. Illustrative examples of mobile stations are described in the previously reference U.S. Pat. No. 5,442,625. The transmitter station 250 includes a convolutional coder 201 which receives digital information (or data signals) from user 1 at a first data bit rate. The output of convolutional coder 201 is coupled to interleaver 202 and then to a Walsh modulator 203, all of which are well known in the prior art. The serial-to-parallel (S/P) station 281 is connected to the output of the Walsh modulator 203 and converts the user's input digital information stream into M basic data rate serial information streams. In the following, we use MC-CDMA as an illustrative method of providing higher data rates.

The serial-to-parallel station 281 converts a user's serial digital information input, which may be up to $M_{max}$ times the basic source rate B (where $M_{max} \cdot B \leq$ channel rate), into M data streams (where M is an integer $\leq M_{max}$). The outputs of S/P station 281 connect to code spreaders 204, 224, and 244, which spread each of the M data streams, respectively, into a channel bit rate using codes $C_1$, $C_2$, and $C_M$ which are unique to user 1. The combiner 254 combines the output of code spreaders 204, 224 and 244. The output signal combiner 254 is coupled to coders 205 and 206. In coder 205, an in-phase code $A_I$ further encodes the signal from combiner 254. Similarly, coder 206 further encodes the signal from combiner 254 using a quadrature-phase code $A_Q$. The codes $A_I$ and $A_Q$ are common to all mobile stations of FIG. 1.

The output of coder 205 is used to modulate the carrier signal $\cos\omega_c t$ in modulator 208. The output of coder 206 is used to modulate the carrier signal $\sin\omega_c t$ in modulator 209. In certain applications, an optional delay station 207 may be utilized to provide better spectral shaping. The output of modulators 208 and 209 are radio frequency signals which are combined in combiner 210 and transmitted via antenna 211 over the air to a base station (e.g., BS1 of FIG. 1).

A base station (e.g., BS1) transmits at a different carrier frequency which is received and decoded by mobile stations MS1.1–MS1.N within its cell site 100. In our illustrative example, receiver 260 of mobile station MS1.1 includes a demodulator (not shown) to demodulate the carrier frequency to obtain a channel bit rate signal which is decoded using codes $A_I$ and $A_Q$ and then de-spread using the associated code sequence $C_1$ to obtain the information data signal to be outputted to user 1.

The base station, e.g., BS1, operates in a similar manner to receiver 260 of mobile station MS1.1 to receive, decode and de-spread the user 1 information data signal. Similarly, the other mobile stations, illustratively represented by mobile station MS1.N, operate in the same manner as mobile station MS1.1, except that user N has a unique code $C_N$ to distinguish it from user 1. In mobile station MS1.N, the in-phase and quadrature codes $A_I$ and $A_Q$, respectively, as well as the carrier frequency $f_c$ are the same as those used for mobile station MS1.1.

Figure 3:
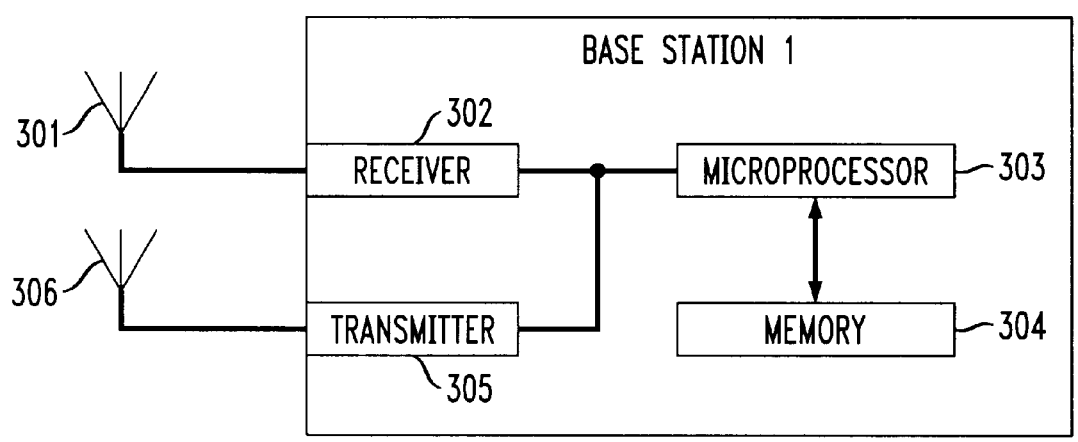
FIG. 3 shows a block diagram of an illustrative base station of the CDMA system of FIG. 1.

With reference to FIG. 3, there is shown an illustrative block diagram of base station BS1. The modulated carrier signal is received at antenna 301 and processed by MC-CDMA receiver 302 under control of processor 303. The receiver 302 operates in a similar manner to the previously described MC-CDMA receiver 260 of mobile station MS1.1 of FIG. 2. Similarly, the MC-CDMA transmitter 305 transmits via antenna 311 and operates in a similar manner to transmitter 250 previously described.

Processor 303, acting under control of programs resident in memory 304, controls the operation of MC-CDMA receiver 302, MC-CDMA transmitter 305 performs typical well-known base station functions and may perform for cell 100, as well, some or all of the load and interference based demand assignment (LIDA) function in accordance with the present invention. This LIDA function is shown in FIGS. 4–9 and is described in later paragraphs. However, the standard functions performed by base station BS1 which are not pertinent to the understanding of the present invention are not discussed herein.

Interference Calculations

With continued reference to FIG. 1, we start by investigating the in-cell and out-of-cell interference caused by a single high rate data user (using multiple codes). The results confirm the need of our demand assignment coupled with network control algorithms, LIDA. The procedure of LIDA algorithms allowing burst access at rates up to M times the basic rate is generally based on the following:

the load information in the cell and its neighbors;
the pilot strength measurements provided by the mobile;
coordination of the burst rate, burst length and burst starting time between neighbor cells.

Coordination of system resources between data users capable of high bit rate burst mode operation and high priority voice users can be managed through LIDA. The LIDA algorithms with various levels of complexity are presented below. To simplify the discussion, we describe the control procedures for the system with a single data user. Procedures for multiple data users are very similar. The control mechanism presented herein is essential to provide a shared burst mode access mechanism over CDMA and is claimed here as a new invention.

In the following description, we assume a CDMA cellular system of FIG. 1 having power control and including only voice users at the various mobile stations MS1.1–MS1.N, MS2.1–MS2.J. Consider cell site 100: when only voice users are served, each in-cell interferer (e.g., MS1.1) causes identical interference at the base station BS1, and therefore appears to be exactly one user, while the average out-of-cell interferer (e.g., MS2.1), aggregated from all cells, in a regular hexagonal grid cellular system 110–160 appear to be γ users. Assuming a path loss exponent of 4, γ is around 0.5. In a system with N voice users per cell, the total interference at each base station is:

$$I_0 = \alpha N(1+\gamma) \quad (1)$$

where α is the speech activity factor. We use the nominal interference, $I_0$, in a voice-only system with a capacity of N users per cell, as the reference QOS in the subsequent discussion.

Let us now examine the in-cell interference with a single data user at time 't' transmitting at M times the basic rate (9.6 kbps or 14.4 kbps, depending on the reference system configuration). Assuming a speech activity factor α around 0.4, under ideal power control, an active data user is equivalent to 2.5 M (=M/α) voice users in its cell. If M=4, the data user consumes the equivalent resources of 10 voice users; i.e., the "equivalent load" of such a data user is 10. With a typical capacity of 15–25 voice users per cell, it is easy to see that a single high rate data user has a large impact on the cell capacity. (Obviously, a mobile station data user's activity factor would affect its average demand; however, the demand assignment of a high data rate burst must account for the maximum interference generated by the data user during its high data rate transmission.)

The impact on out-of-cell interference is considered next. In the voice-only system, where voice users are uniformly distributed in the cells 110–160, most of the out-of-cell interference comes from the users in other cells (e.g., MS2.1) that are near the cell boundaries 111–161. Due to the large path loss exponent, users further away from the boundary (e.g., MS2.N) contribute little to out-of-cell interference. As the high data rate user (e.g., MS1.1), transmitting at M/α times the average data rate of a voice user, moves along path 101 closer to the boundary 121, the in-cell interference to BS1 remains at around M/α while the out-of-cell interference to BS2, caused by the high rate data user, rapidly rises beyond what was computed for the voice system. However, to maintain the required Quality of Service (QOS), the total interference at each cell must be controlled to be no more than $I_0$.

To quantify our discussion above, assume there are $N_v$ voice users per cell and one active (transmitting) high rate data user in the host cell, the total interference in the host cell and in the closest neighboring cell (with respect to that data user) can be expressed as follows:

$$I_d(r) = \alpha N_v(1+\gamma) + M\gamma_d(r), \quad (2)$$

where 'r' is the distance from the active high rate data to its host cell site. $\gamma_d(r)=1$ for the host cell since it is power controlled by that cell and $\gamma_d(r) \approx (2R-r)^4/r^4$ for the neighboring cell it approaches, where R is the cell radius. The access control mechanism for high rate data users must satisfy the constraint:

$$I_d(r) \leq I_0 \quad (3)$$

in both the host cell and the approached neighboring cell. We will seek to adjust $N_v$, the number of voice users, or M, the multiple of the basic data rate B being used by the data user, as a function of 'r', in order to meet the interference constraints. The issues and our strategies are elaborated in the next sections.

Interference Management Using Pilot Strength Measurements

In the above discussion, the out-of cell interference due to a data user is a function of (2R–r)/r. Hence, the access controller should use the knowledge of the distance of the mobile from the cell site to determine permitted values of $N_v$ and M. There are two issues with using 'r' as the control variable. First, the distance of the mobile from the cell site cannot be determined accurately. More importantly, although the discussion of out-of-cell interference above is in terms of the distance 'r', the actual interference is strongly dependent on the shadow fading conditions in addition to the distance. Hence, control based on geographic distance is neither optimal nor practical. The present invention uses a control based on radio distance, using pilot strength measurements to address both issues. This solution can easily be an integral part of a CDMA system.

In current CDMA systems, mobile assisted soft handoff is implemented as follows. The base station provides the mobile with a neighbor list of pilots. The mobile periodically measures the pilot strength on its neighbor list and transmits it to the cell site. If the pilot strength of a base station to which the mobile is not connected is greater than a threshold $T_{add}$, the base station initiates a soft handoff for the mobile. The present invention extends the concept of using pilot strength measurements for soft handoff decisions to using it for access control of high data rate users.

Figure 4:
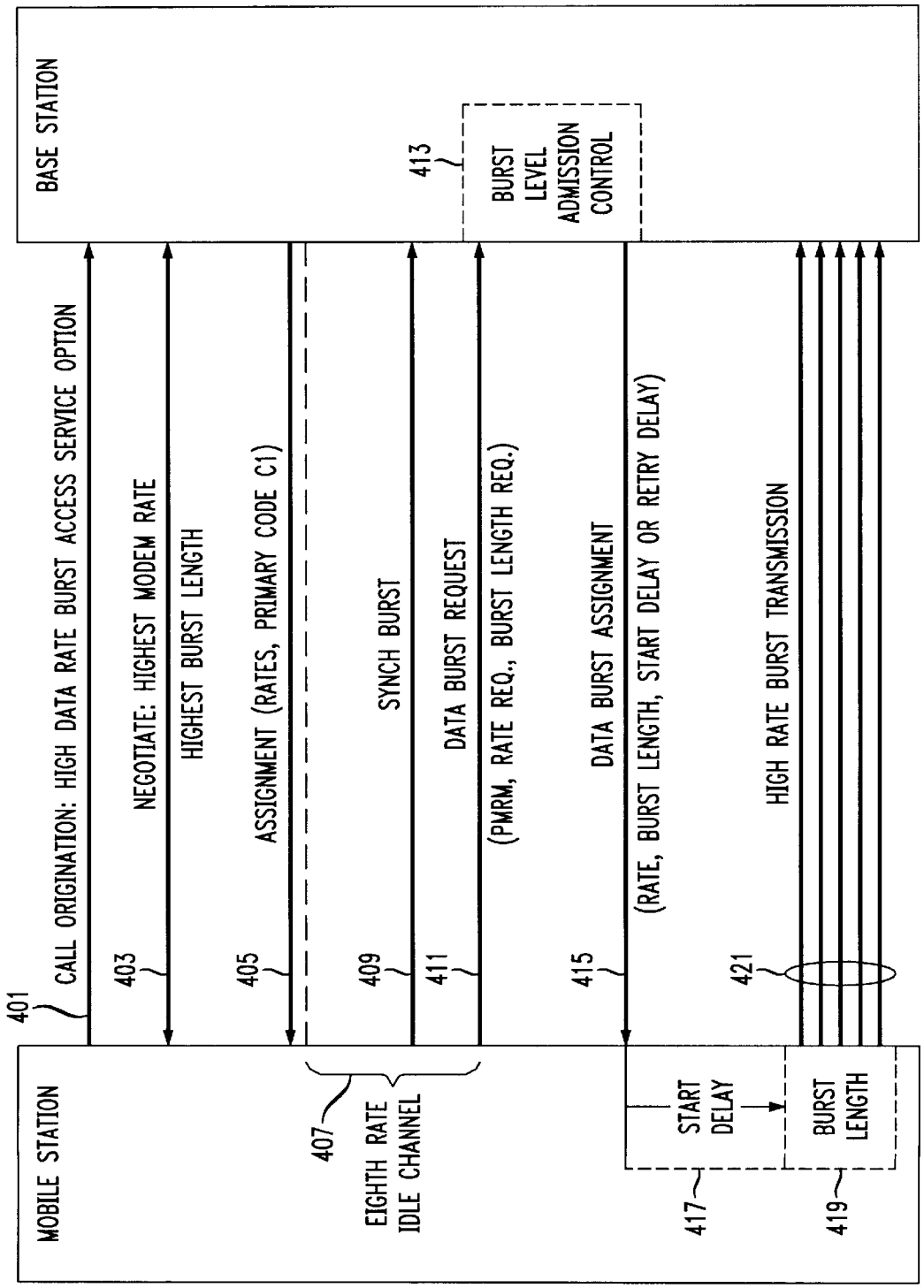
FIG. 4 shows a flow diagram describing how a base station provides load and interference based demand assignment services to a mobile user in accordance with the present invention.

With reference to FIG. 4, we describe a CDMA system of FIG. 1 incorporating our LIDA capability (hereinafter LIDA). In step 401, a mobile originates a call requesting high data rate burst mode service option. In step 403, the mobile and base station negotiate the highest modem rate and the highest burst length for the mobile.

As shown in step 405, each user is assigned a unique primary code, i.e., $C_1$, determined as the user-specific PN sequence. When a user is quiescent, 407, a very low rate (say, eighth rate) (sub-rate) signaling channel is maintained using its primary code. This sub-rate channel helps in maintaining synchronization and coarse power control. It is maintained whether the user is "connected" to one base station or is in soft handoff with multiple cells. Since the transmission during eighth rate frames is intermittent, both the synchronization and the power control are inadequate if the quiescent period is long.

Hence, any transmission from the mobile after a long quiescent period 407 may be lost. This problem is overcome by requiring the mobile to transmit a synch burst 409 of one (or more) basic rate frame(s) at the end of a "long" quiescent period. Following the synch burst that gives the receiver time to synchronize and provides power control feedback, the mobile station signals a request 411 for data burst transmission using signaling messages over the basic rate (B) channel. Alternately, instead of the synch burst in steps 407, 409, the mobile station could be required to transmit the request 411 multiple times.

The access request 411 from the mobile station contains the data rate requested and the burst length requested. The maximum burst length that may be requested by mobile is specified by the system (and is chosen to best coordinate shared access between users). In addition, to provide interference information to the base station, the access request from the mobile includes pilot strength information, e.g., PMRM (for base stations of cells in its neighbor list, for example, MS1.1 would include pilot strength measurements on the base station of cells 110–160). (Note, the inclusion of the pilot strength measurements within the access request is independent of (and in addition to) any such reports used for handling soft handoffs.) The pilot strength measurements received from the mobile (e.g., MS1.1) indicate to the base station (e.g., BS1) the interference levels that that mobile would generate at neighboring base stations (e.g., BS2). This measure of interference accounts for both the distance loss and shadow fading and thus is a measure of the radio distance to the neighboring base station, and will be used to make access control decisions of step 413.

Specifically, in the presence of shadow fading, the average interference at the cell site for the basic voice-only system is modified from Equation 1 as described in the article by K. S. Gilhousen et al. entitled "On the Capacity of a Cellular CDMA System" (*IEEE Trans. Veh. Technol*, Vol. VT-40, No. 2, May 1991, pages 303–312). Let us denote it as $I_0^s = \alpha N(1+\gamma^s)$, where $\gamma^s$ is the average out-of-cell interference in the presence of shadow fading. Similarly, in an integrated voice and data system, the interference factor for a data user in a neighboring cell is $\gamma_d^s(z_1,z_2)=z_1/z_2$, where $z_1$ and $z_2$ are the path loss of the mobile to the host cell and the neighboring cell, respectively. Note that $\gamma_d^s(z_1,z_2)=1$ in the case of the host cell because of power control. The path loss (radio distance) $z_1$ and $z_2$ include the distance loss component as well as the shadow fading component. The interference constraint becomes:

$$I_d^s(z_1,z_2)=\alpha N_v(1+\gamma^s)+M\gamma_d^s(z_1,z_2)\leq I_0^s. \quad (4)$$

The values $z_1$ and $z_2$ are derived from the pilot strength measurements.

As will be described in FIG. 5, step 413 is performed by an access controller located at the base station (or at one of the base stations in case of soft handoff) or at a separate location shown by 190 of FIG. 1. In step 415, this assignment is then transmitted to the mobile. If the scheduled list is longer than the threshold L, the mobile is told to retry later (Retry Delay) in step 415. The base station selects the value of this parameter based upon loading conditions at that base station. When a mobile receives a delay parameter in a data burst assignment message 415, it initiates such a delay, step 417, before starting its transmission of the assigned burst length, step 419, and at the assigned data rate, step 421. In an alternate embodiment, the mobile may be required to wait for an explicit BEGIN message to begin high data rate transmission.

Figure 5:
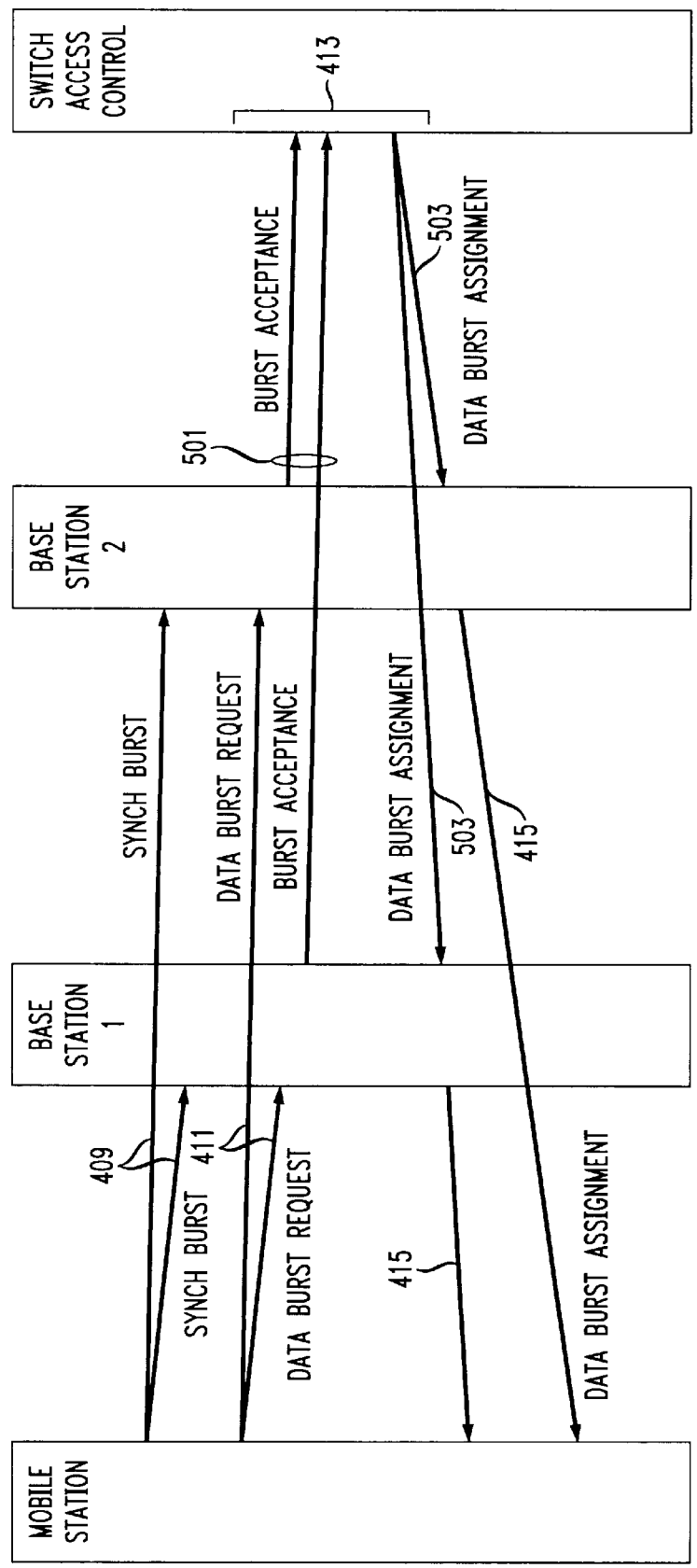
FIG. 5 shows a flow diagram of how the switch access controller coordinates a soft handoff between cells.

With joint reference to FIGS. 1, 4 and 5, we describe how the access controller coordinates a burst access of a mobile station (e.g., MS1.1) during soft handoff from a base station BS1 in cell 100 and a neighbor base station BS2 in cell 120. The steps 409, 411 and 415 proceed as previously described. FIG. 5 shows a burst acceptance message 501 sent to access controller which performs the processing steps 413 required during the soft handoff. These processing steps will be described in more detail in later paragraphs with reference to FIGS. 6, 7 and 8. After processing, access controller sends a data burst assignment command, step 503, to both base stations and they send the data burst assignment message 415 to the requesting mobile station.

Autonomous Access Control

Figure 6:
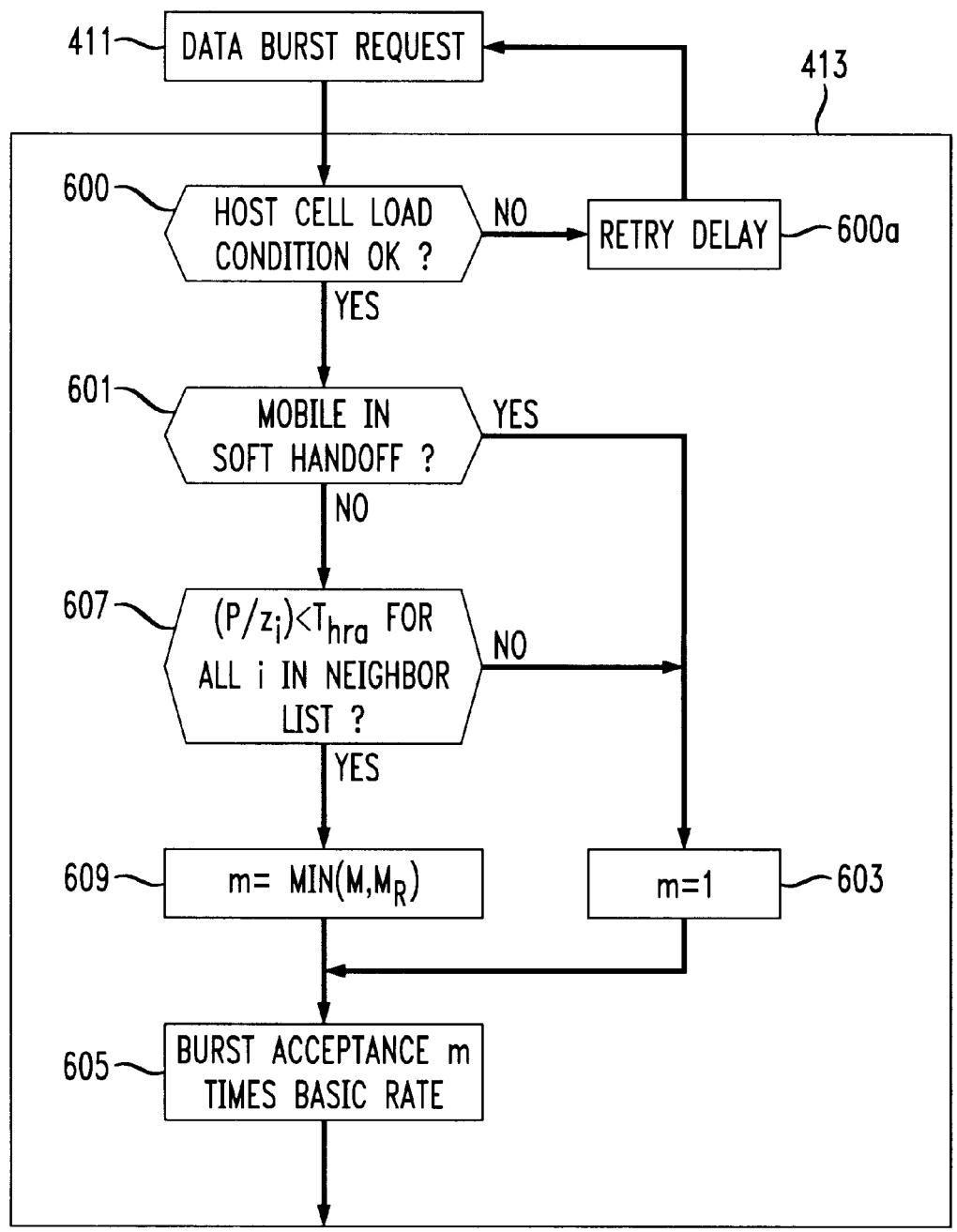
FIG. 6 shows a flow chart of the autonomous access control feature of the present invention.

With reference to FIG. 6, we describe our autonomous access control feature of the present invention. As described in step 411 above, the mobile station provides pilot strength measurements (e.g., PMRM) in the access request. If the host's load condition is too close to a predetermined load level, step 600, then a retry delay command is sent, in step 600a. If the host load condition permits a burst access, but the mobile is in a soft handoff, step 601, then the access controller limits the mobile to the basic data rate B (i.e., multiplier m=1). The burst assignment message, step 605, permitting a data rate of m times the basic rate B is sent to the requesting mobile. If the host load condition permits burst access and the mobile is not in soft handoff, then step 607 is performed. In step 607, the base station pilot strength measurements for all neighbors, 'i', are determined. The pilot strength measurement $P/z_i$ (PMRM of 411) is formed for all base stations 'i' in the neighbor list, where P is the known transmission power level of the base stations and $z_i$ is the path loss or radio distance. If $P/z_i$ is below a high rate data access threshold $T_{hra}$, it indicates that the mobile will not cause any excess interference to neighbor base stations and the mobile is permitted (step 609) to transmit a rate which is the minimum of the requested multiple M or the maximum multiple $M_R$. (The mobile and the base station can locally generate the M codes needed for the multiple rate transmissions using subcode concatenation in MC-CDMA as described in the previously referenced patent. In step 605, the access controller sends the burst assignment message to the requesting mobile.

The threshold $T_{hra}$ is chosen such that the total interference received from a requesting mobile at any neighbor base station is less than $I_0$. Note that to accommodate high rate data users the system may limit the number of voice users $N_v$ to be smaller than the maximum permissible in a voice-only system. There is a tradeoff between raising $T_{hra}$ and increasing $N_v$, the number of voice users per cell.

If it is determined that the requesting mobile is to be permitted to transmit at the high rate, the base station may have to schedule the burst transmission. Since the load and interference situation may be time varying, the decision to permit is valid only for a period of time Q that depends on system load, shadow fading dynamics, and user mobility. This time Q corresponds to L frame durations. The base station checks its list of scheduled bursts and adds the requesting mobile to the list if it is shorter than L frames.

If any one of the neighbor base station pilot strengths $(P/z_i)$ in step 607 is determined to be higher than the threshold $T_{hra}$, the mobile is permitted only to transmit at the basic rate B, step 603.. High rate access will not be allowed for the requesting mobile until all neighbor base station pilot strengths are found to be below $T_{hra}$. Note that the soft handoff decisions are made separately. The soft handoff add and drop thresholds $T_{add}$ and $T_{drop}$ will typically be larger than the high rate data access threshold $T_{hra}$. Consequently, as previously discussed in step 601, mobiles in soft handoff will only be allowed to transmit at the basic rate B (i.e., m=1). Conversely, any transmission at basic rate B requires no demand assignment.

This autonomous access control is attractive for its simplicity, but it has some limitations. For example, mobiles may be in soft handoff in a significant portion of the coverage area. Schemes that permit higher rate access even during soft handoff are presented hereinafter.

Enhanced Autonomous Access Control

Figure 7:
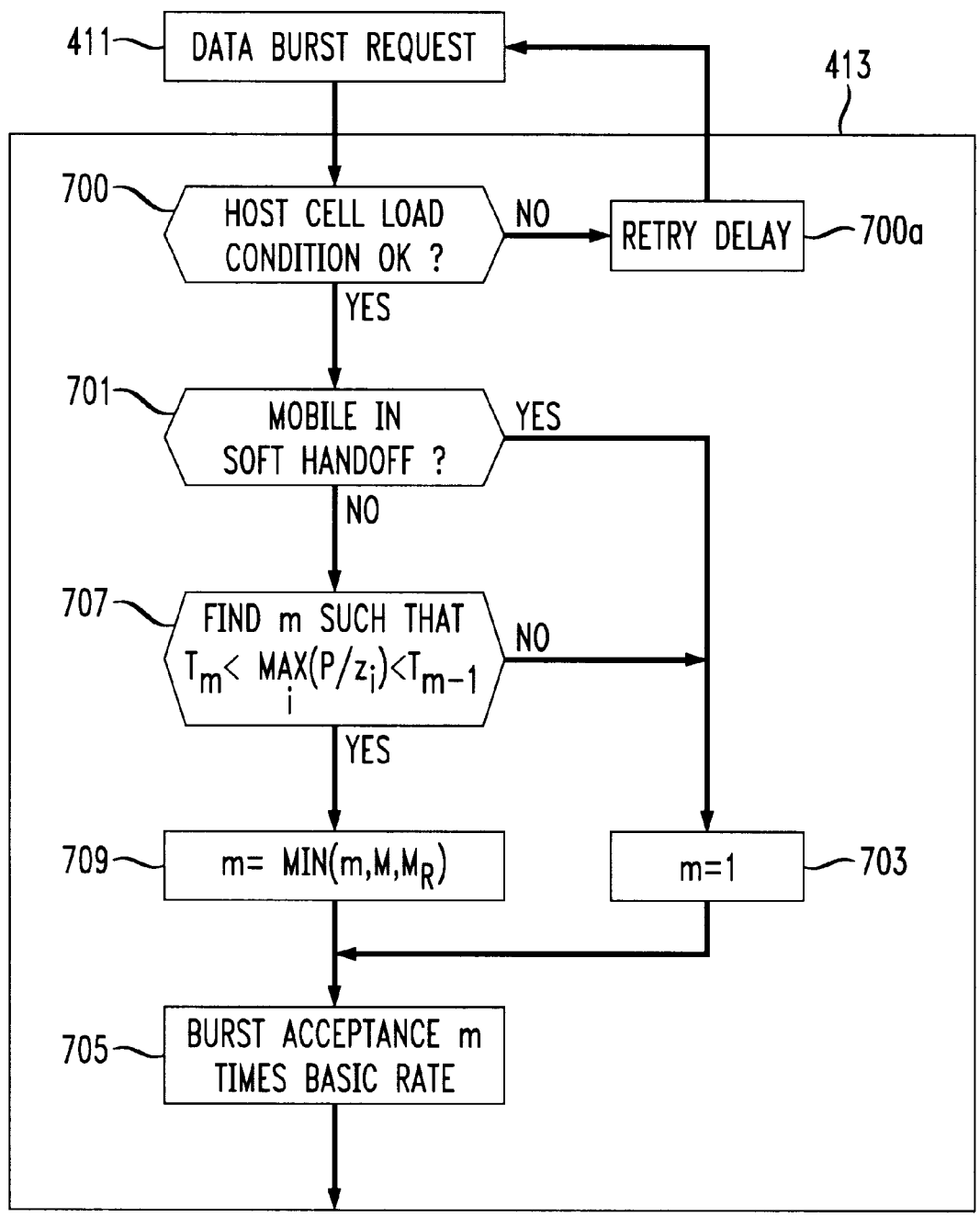
FIG. 7 shows a flow chart of an enhanced autonomous access control feature.

With reference to FIG. 7, we describe our enhanced autonomous access control feature. The previously described autonomous access control permits only two selection data rates, namely a basic rate (m=1, step 603) and a high rate, which is the minimum of the requested rate M or the system's maximum rate $M_R$ (step 609). The enhanced autonomous access control feature creates multiple thresholds which increase the coverage area for higher rate data users such that rates two, three, . . . times (even non-integer multiples) higher than the basic rate B can be assigned. Thus, data users requesting higher data rates are usually assigned a higher data rate when they are more centrally located in their cell and assigned succeedingly lower data rates as they approach a cell boundary.

Figure 10:
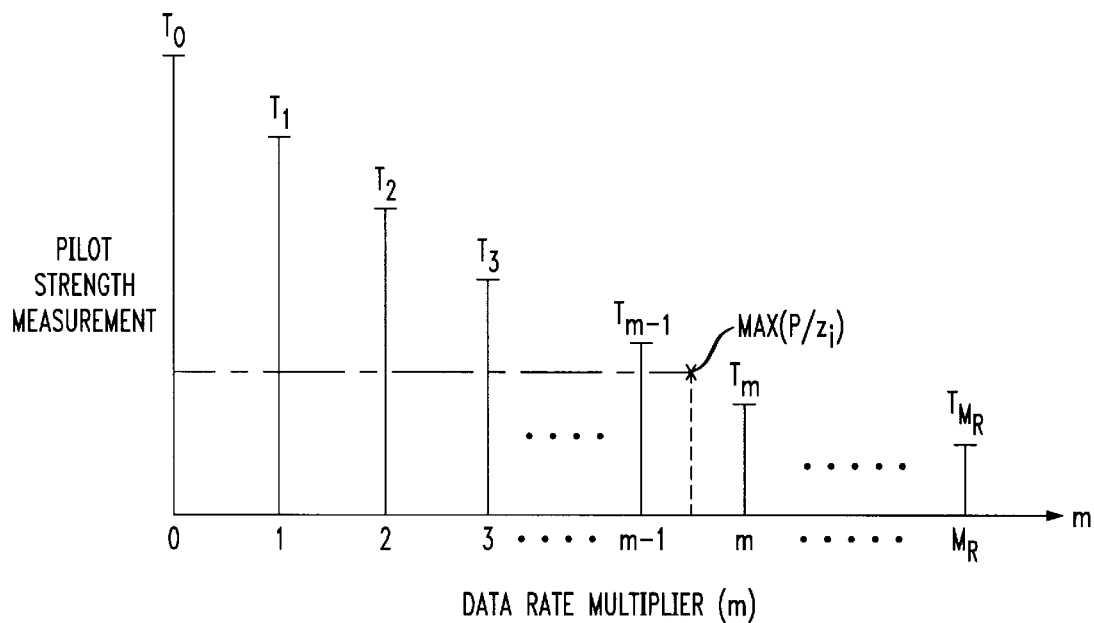
FIG. 10 shows an illustrative graph of the received pilot strength measurements versus the data rate multiple m.

In steps 700 and 700a, the host cell's load condition check is performed in the same manner as in steps 600 and 600a. If the mobile (e.g., MS1.1) is in soft handoff, then step 703 and step 705 are performed in the same manner as steps 603 and 605. However, if the mobile is not in soft handoff, then the access controller selects a data rate using step 707. In step 707, the maximum pilot strength $P/z_i$ from all base stations 'i' in the neighborhood is determined from the set of pilot strength measurements reported by mobile MS1.1, in step 411. The access controller compares the maximum pilot strength with a set of thresholds $\{T_m, m=0, 1, \ldots M_R\}$, where $T_m > T_{m+1}$, as shown in FIG. 10. Each threshold $T_m$ corresponds to a different permitted data rate multiple m. For consistency, $T_0 = P$ and $T_{M_R} = T_{hra}$. If any neighbor's pilot strength $P/z_i$ is not below the threshold $T_1$, then the mobile MS1.1 is permitted by its base station BS1 only to access the basic rate B (m=1), as shown in step 703. If the maximum of pilot strength $P/z_i$ is between $T_m$ and $T_{m-1}$, then the data rate multiple m is selected as shown in FIG. 10, so that the interference at any neighbor cell's base station is less than $I_0$. Again, in step 709, the access controller selects the data rate multiple m to be no greater than the system limit $M_R$ and the requested multiple M. In step 705, the burst assignment message 503 includes the rate multiple m. As before, the base station checks its list of scheduled bursts and adds the mobile to its request list, if the list is shorter than L frames, and transmits the assignment message 415 to the mobile. If the scheduled list is longer than the threshold L, the mobile is told in message 415 to retry later.

On the other hand, if in step 707 any neighbor's pilot strength is above the $T_1$ threshold, then it means that a high rate transmission from that mobile MS1.1 may cause excessive interference in that neighbor's cell. Consequently, the mobile is restricted to the base rate (m=1) as shown in step 703.

The present invention enables an access controller, either centrally located or located at one or more base stations, e.g., BS1, to autonomously determine the largest value of 'm', corresponding to 'm' times the basic rate B, at which the mobile MS1.1 may transmit while satisfying the following interference constraint:

$$\alpha N_v(1+\gamma^s)+m\gamma_d^s(z_1,z_2) \leq I_0^s, \qquad (5)$$

where $\gamma_d^s(z_1,z_2)=1$ for the host cell. Thresholds $\{T_m\}$ are defined to satisfy Equation 5 for bit rate multiples m=1, 2, . . . ; up to $M_R$. Again, mobiles in soft handoff will be only allowed to transmit at basic rate (m=1); which requires no extra negotiations among cells involved in the handoff.

This enhanced scheme of FIG. 7 requires little additional complexity as compared to the single threshold scheme of FIG. 6.

Figure 9:
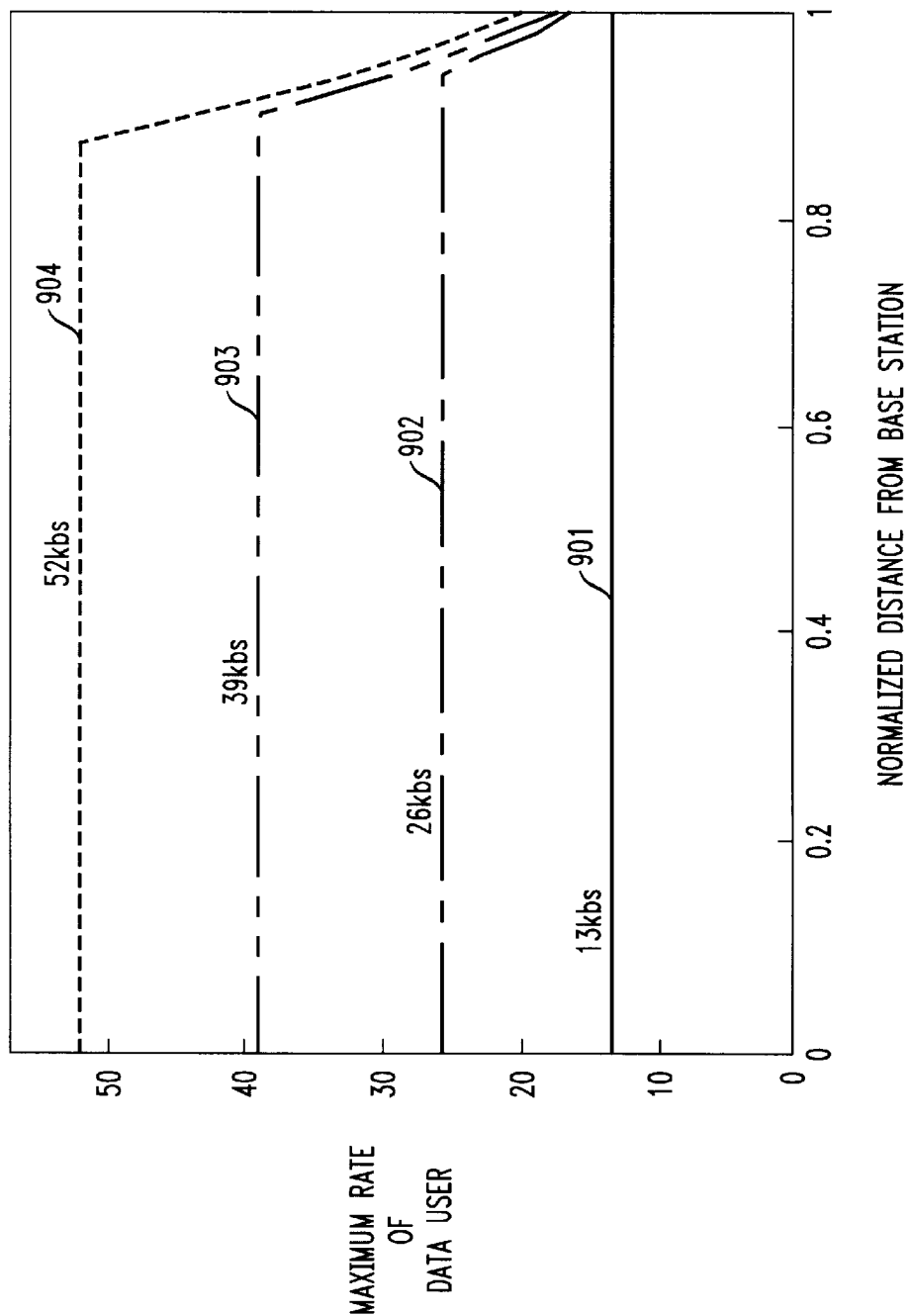
FIG. 9 shows an illustrative graph of the data rates allowed to a user as a function of distance to the base station.

With reference to FIG. 9, there is shown a graph of how allowed data rates for a mobile user in a cell with 25 voice users vary as a function of the distance to the base station, assuming 21 voice users are in the handoff cell. FIG. 9 shows that these multiple thresholds 901–904 are quite close to each other and may not be distinguishable within the noisy pilot strength measurements; and the drop off from acceptable interference at m times the basic rate B (902–904) to basic rate B (901) is quite rapid in terms of the normalized distance from the base station.

Neighbor Coordinated Access Control

Figure 8:
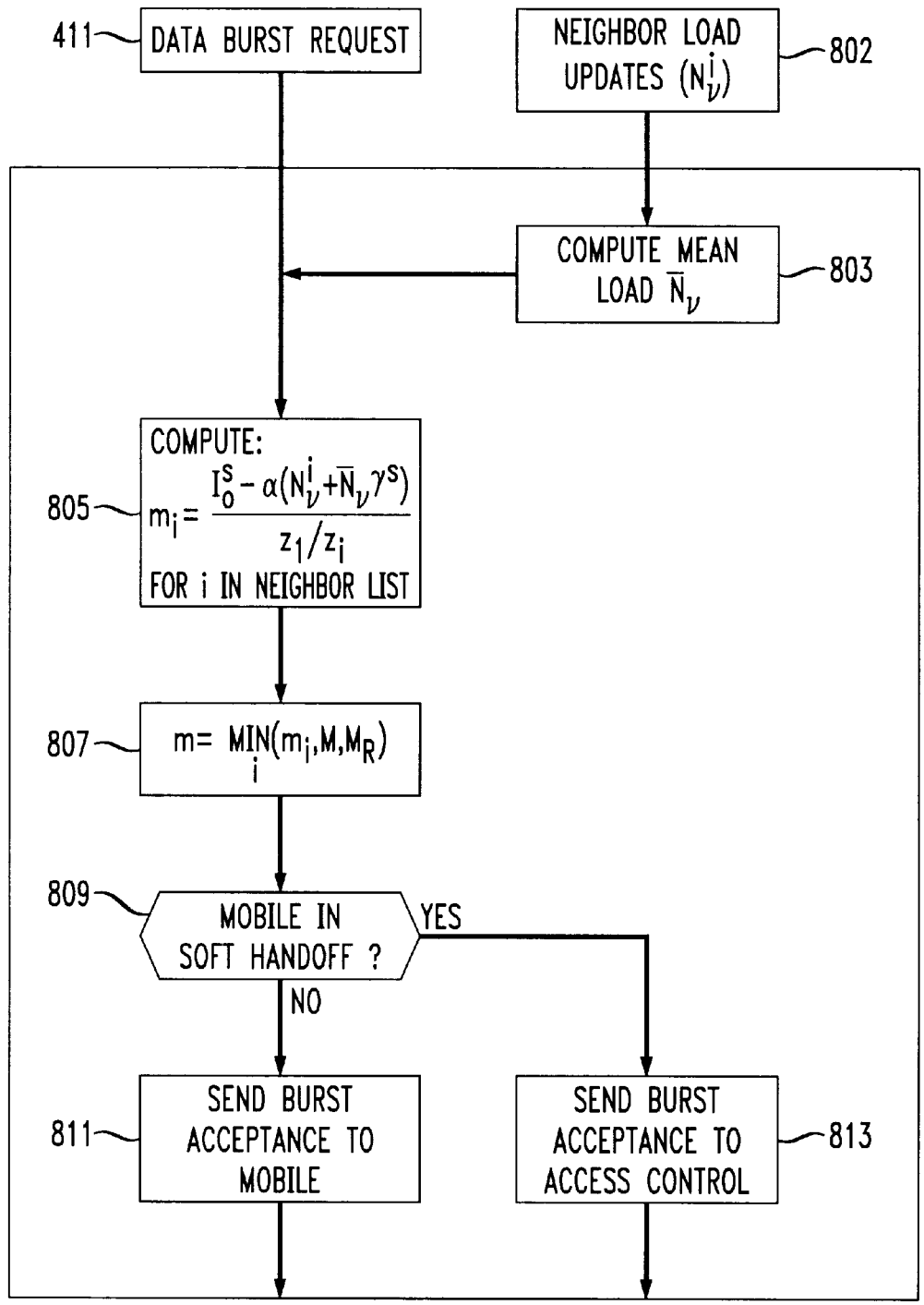
FIG. 8 shows a flow chart of a neighbor coordinated access control.

With reference to FIG. 8, we describe our neighbor coordinated access control feature. Neither of the schemes above account for instantaneous loading in the neighbor cells. As discussed in the following paragraphs, light loading in neighbor cells can be exploited to permit higher rate access while still meeting the interference constraint $I_0^s$.

When a mobile MS1.1 is connected to a single base station BS1, the rate assignment decision in response to a high data rate access request, 411, is facilitated if the load at the neighbor cells is known, 802, to the base station BS1. In step 803, the base station computes the mean load $\bar{N}_v$. In step 805, instead of fixed thresholds, the base station BS1 makes rate assignment decisions by determining the smallest 'm' that satisfies the following inequality for all neighbor base stations and itself:

$$\alpha(N_v^i + \bar{N}_v \gamma^s) + m\gamma_d^s(z_1, z_i) \leq I_0^s, \quad (6)$$

where $\bar{N}_v$ is the average number of voice users per cell in the neighborhood, $N_v^i$ is the number of voice calls in cell 'i' and $z_i$ is the "radio distance" of the data user to base station of cell 'i', where 'i' is the index of the neighbor list. The host cell corresponds to i=1. Actually, for each neighbor cell, the value $N_v^i$ should be considered as the "load in terms of equivalent" voice calls. By choosing the smallest 'm' that satisfies Equation 6 (step 805) for all neighbor cells 'i', we ensure that the admission of a burst at 'm' times the basic rate B will not cause excessive interference at any neighbor. In this case, the only communication required is for the neighbor cells to periodically provide updates, step 802, of their current load. In step 807, the multiple 'm' is selected to be the minimum of $m_i$, M and $M_R$. In step 809, if the mobile is not in soft handoff, then, as before, if the scheduled list is shorter than L frames, the rate assignment and burst parameters are provided to the mobile, step 811; otherwise, the mobile is told in step 811 to retry.

When the mobile is in soft handoff, in step 809, the access request (that includes pilot strength measurements) is received by all the connected base stations. Again, the simplest strategy is to let the mobile transmit only at the basic rate (without access control) when it is in soft handoff. To permit higher data rates in soft handoff, more sophisticated coordination between neighbor base stations is necessary. Each base station performs similar computations as in step 805 to determine the maximum permitted rate 'm', the permitted burst length and the earliest starting time. However, instead of transmitting this assignment to the mobile, this information is forwarded, in step 813, to the access controller located at the "primary" base station or at the central switch (190 of FIG. 1). The controller 190 compares the assignment made by each of the base stations, and then chooses the minimum of the rate assignments and burst lengths proposed by the soft handoff cells and the last of the proposed starting times. It then creates the assignment message (503 of FIG. 5) and transmits it to the mobile in soft handoff (step 415 of FIG. 5). If any one of the base stations indicates that its scheduled list is long and the mobile must retry, then a retry message is sent out to the mobile in step 415. Note that because the controller 190 must choose the minimum of the rates allowed by the different cells and the last of the starting times, care must be taken to avoid compromising channel utilization efficiency in the cells involved in the soft handoff.

Enhanced LIDA (Load and Interference Based Demand Assignment)

The above described LIDA admits a data burst if the worst-case interference caused by the mobile at the adjacent base stations is below a certain threshold. LIDA uses pilot strength measurement information provided by the mobile in its burst request, to estimate the interference that would be caused at the adjacent base stations, if the requested burst is admitted. The burst is admitted if the highest of neighbor cell pilot strength measurements, as reported in the mobile burst request, falls below a pre-determined threshold (see for example, steps 607, 707 in FIGS. 6 and 7, respectively)..

While our above-described basic LIDA (i.e., pilot-strength based admission) algorithm performs well, we have recognized that improving the following characteristics further enhances performance:

i. Since the basic algorithm is based on fixed thresholds, bursts may be denied even when the system is lightly loaded.

ii. The interference estimation in basic LIDA does not account for the fact that reverse link power control from the active base stations determines the mobile transmit power which in turn causes interference at the non-active base stations. The basic algorithm does not discriminate between signal energy received at active base stations (defined as the list of base stations the mobile is in soft-handoff with) vis-a-vis non-active base stations (complement of active set). This is an important distinction since the signal received at the active base-stations provides useful signal energy which is strictly power controlled, while the signal received at the non-active base stations contributes to the interference, and needs to be controlled through the admission algorithm for better performance.

iii. High rate burst admission causes a sudden increase in interference at active and adjacent base stations. This can cause a transient performance degradation for many existing users.

iv. As the system forward link load increases, the pilot strength from all pilots (including non-active pilots) decreases. Thus, paradoxically, in basic LIDA, the high speed data burst admission probability increases with increasing forward link load.

v. The scheme computes the interference at the adjacent cells by using the relative path loss component, but does not account for the forward link loading.

The following enhanced version of LIDA (E-LIDA) adds these improvements.

i. The basic LIDA (pilot-strength based admission) algorithm may be applied only for adjacent base stations whose load exceeds a certain load threshold. A base station (BS) reports its load status to all neighbor base stations each time its load crosses a certain threshold, so that the neighbors may enable admission control on BS's pilot. A hysterisis is applied to avoid too-frequent messaging. This permits bursts, which would have been denied under LIDA to be admitted when the system is lightly loaded.

ii. Codes allocated to a high rate burst are increased gradually, added one at a time. This ensures that the interference seen by the other users goes up incrementally, giving the reverse link power control of the other users in the system, time to respond. This gradual increase in the number of codes can be either handled autonomously by the mobile station, or be controlled explicitly by the base station and/or the access controller through burst assignment messages.

iii. Bursts are admitted if the ratio of the pilot strength measurement of the best pilot of the non-active set to the pilot strength measurement of the best pilot from the active set falls below a predetermined threshold (see equation 12). The pilot strength measurement from the active set is computed based on the combining method used on the reverse link by the base stations in the active set. If the base stations use the well known selection combining techniques (e.g., at the frame selector in soft handoff) the combined pilot strength measurement is given by the best active pilot. If the base stations use the well-known maximal ratio combining (e.g. at the base stations in softer handoff), the combined pilot strength measurement is given by the sum of the pilot strength measurements of the active pilots. Note that, it is usual practice to measure the power level of these pilots in dB, in which case the ratio discussed here is actually computed as a difference as in the dB levels as shown in the example below.

Figure 11:
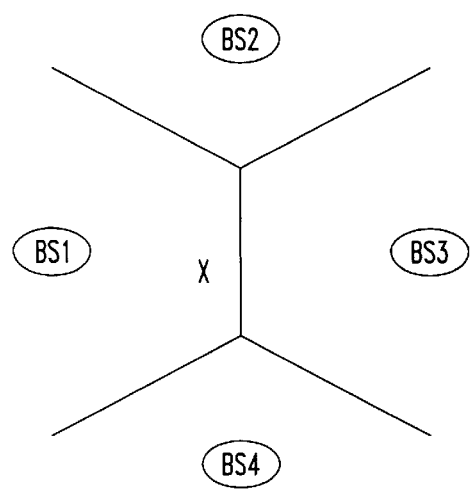
FIG. 11 shows an illustrative example of a CDMA system with the four nearest base stations BS1–BS4 to a mobile station X.

Example Consider the illustrative CDMA system of FIG. 11, with the four nearest base stations BS1–BS4 to a mobile station X. Let the measured pilot strengths from the base stations BS1–BS4 be a1–a4, (in dB), respectively.

a. Assume mobile X is in a simplex connection, i.e. is only connected to base station BS1. This situation is also described as base station BS1 being active or in the Active Set of mobile X, while base stations BS2, BS3 and BS4 are described as non-active base stations or as base stations not in the Active Set for mobile X. Equivalently, pilot a1 is referred to as an active pilot, while pilots a2, a3 and a4, are referred to as non-active pilots. With these definitions, using the basic LIDA algorithm (FIG. 6), the largest non-active pilot is compared with a burst acceptance threshold T1 to determine burst acceptance. That is, the burst is admitted (see step 607 of FIG. 6) if $$\max\{a2, a3, a4\} < T1 \quad (7)$$

Otherwise, the burst is denied.

Using our enhanced E-LIDA algorithm, we consider the difference between the highest non-active pilot and the highest active pilot:

$$\max\{a2, a3, a4\} - a1 < T2 \quad (8)$$

where T2 is a differential burst acceptance threshold. Note that this makes the burst admission decision a function of the strength of the active pilots. If the active pilot strength a1 is large (corresponding to the mobile having a small path loss to base station 1), then the difference in (8) is small, increasing the likelihood of burst admission compared to a scheme (e.g., the basic LIDA algorithm) that does not use the pilot strength of the active pilots.

b. Now assume that the mobile X is in soft handoff with base stations 1 and 3, while base stations 2 and 4 are not on the mobile's active set. That is, base stations 1 and 3 are in the Active Set of mobile X, while base stations 2 and 4 re not in the Active Set. Equivalently, pilots 2 and 3 are active pilots, while pilots 2 and 4 are non-active pilots. Using the basic LIDA algorithm, a burst is admitted if $$\max\{a2, a4\} < T1 \quad (9)$$

Otherwise, burst is denied.

Using our enhanced E-LIDA algorithm, we consider the difference between the highest non-active pilot and the highest active pilot. That is, a burst is admitted if, $$\max\{a2, a4\} - \max\{a1, a3\} < T2 \quad (10)$$

in the case that the base stations use selection combining.

If the base stations use optimal combining techniques, then a different admission criterion must be used:

$$\max\{a2, a4\} - (a1+a3) < T3 \quad (11)$$

In both cases, our enhanced E-LIDA algorithm makes the burst admission a function of the path loss to the active base stations.

In the general case, the burst admission criteria using our enhanced E-LIDA algorithm becomes:

$$\max\{\text{Pilot Strengths of Base Stations not in the Active Set}\} - \max\{\text{Pilot Strengths of Base Stations in the Active Set}\} < T2 \quad (12)$$

for the case when the base stations do selection combining. Or, $$\max\{\text{Pilot Strengths of Base Stations not in the Active Set}\} - \Sigma\{\text{Pilot Strengths of Base Stations in the Active Set}\} < T3 \quad (13)$$

for the case when the base stations do maximal ratio combining. This may be compared with the basic LIDA burst admission criterion:

$$\max\{\text{Pilot Strengths of Base Stations not in the Active Set}\} < T1 \quad (14)$$

It is also possible to improve the the results of the prior LIDA arrangement by making the threshold T1 a function of forward link load. Thus, T1 can be decreased proportional to the increase in the forward link load. For example, for each 1 dB increase in load, threshold T1 may be decreased by 1 dB. Here, the forward link load is the percentage utilization of the forward link capacity. This value can be determined at the base stations, or may be measured as the "noise rise" above thermal noise by the mobile station and reported back to the base stations.

SUMMARY

When the present invention is implemented as a MC-CDMA system with LIDA or E-LIDA, it offers the following features:

It provides data services at high access bandwidths with minimal changes to the IS-95 air interface and the IS-99 data standard (up to 56 kbps for IS-99-based CDMA and related standards).

It is well suited for use with sub-code concatenation, as described in the previously referenced patent.

The high bandwidth demand assignment per burst is based on load and channel conditions.

Access control in the network ensures priority for voice and other high priority users.

It uses transmitter oriented codes with dedicated receivers per connection.

It sacrifices (some) Forward Error Correction (FEC) in favor of retransmission using ARQ to reduce $E_b/N_0$ requirement, and increase capacity.

Although our control scheme provides high rate access using MC-CDMA, the control scheme, LIDA, presented is transparent and thus equally applicable to any physical layer implementation of higher data rate access over CDMA.

What has been described is merely illustrative of the application of the principles of the present invention. Other arrangements and methods can be implemented by those skilled in the art without departing from the spirit and scope of the present invention.

What is claimed is:

1. In a code division multiple access system including multiple cells, each cell having a base station and multiple mobile stations, a method of allocating bandwidth to a mobile station comprising the steps of:

receiving, at a base station of a first cell, a data burst request from a mobile station of said first cell requesting a first data rate in excess of the basic data rate B allocated to that mobile station, said data burst request including pilot strength information for the base station of said first cell and a base station of at least one cell adjacent to said first cell;

at an access controller, using the received pilot strength information to determine an increased data rate which is to be granted to said requesting mobile station without causing excessive interference at said first cell and said at least one adjacent cell;

transmitting a data burst assignment response from the access controller to said requesting mobile station indicating the increased data rate which has been granted to said requesting mobile station; and wherein the access controller gradually increases the data rate by adding one code at a time to the requesting mobile station.

2. In a code division multiple access system including multiple cells, each cell having a base station and multiple mobile stations, a method of allocating bandwidth to a mobile station comprising the steps of:

receiving, at a base station of a first cell, a data burst request from a mobile station of said first cell requesting a first data rate in excess of the basic data rate B allocated to that mobile station, said data burst request including pilot strength information for the base station of said first cell and a base station of at least one cell adjacent to said first cell;

at an access controller, using the received pilot strength information to determine an increased data rate which is to be granted to said requesting mobile station without causing excessive interference at said first cell and said at least one adjacent cell;

transmitting a data burst assignment response from the access controller to said requesting mobile station indicating the increased data rate which has been granted to said requesting mobile station; and wherein the access controller further performs the steps of
determining a difference between the maximum received pilot strength information from a non-active base station not in connection with the mobile station and the maximum received pilot strength information from an active base station in connection with the mobile station,
comparing said difference with a threshold, and
increasing the data rate assigned to said requesting mobile station when said difference has a predetermined relationship to that threshold.

3. In a code division multiple access system including multiple cells, each cell having a base station and multiple mobile stations, a method of allocating bandwidth to a mobile station comprising the steps of:

receiving, at a base station of a first cell, a data burst request from a mobile station of said first cell requesting a first data rate in excess of the basic data rate B allocated to that mobile station, said data burst request including pilot strength information for the base station of said first cell and a base station of at least one cell adjacent to said first cell;

at an access controller, using the received pilot strength information to determine an increased data rate which is to be granted to said requesting mobile station without causing excessive interference at said first cell and said at least one adjacent cell;

transmitting a data burst assignment response from the access controller to said requesting mobile station indicating the increased data rate which has been granted to said requesting mobile station; and wherein the pilot strength information of said at least one adjacent cell is considered only when a load status at said at least one adjacent cell exceeds a predetermined threshold.

4. The method of claim 3 wherein each of said at least one adjacent cell reports its load status to one or more adjacent cells when its load status crosses a predetermined threshold.

5. The method of claim 4 wherein a load status report is sent when a load status exceeds a first threshold and when a load status falls below a second threshold lower than the first threshold.

6. The method of claim 4 wherein the frequency of said load status reports are controlled so not to exceed a predetermined frequency rate.

7. A code division multiple access system including multiple cells, each cell having a base station and multiple mobile stations, the system comprising:

receiving means, at a base station of a first cell, receiving a data burst request from a mobile station of said first cell requesting a first data rate in excess of the basic data rate B allocated to that mobile station, said data burst request including pilot strength information for the base station of said first cell and a base station of at least one cell adjacent to said first cell;

an access controller, using the received pilot strength information to determine an increased data rate which is to be granted to said requesting mobile station without causing excessive interference at said first cell and said at least one adjacent cell and transmitting a data burst assignment response to said requesting mobile station indicating the increased data rate which has been granted to said requesting mobile station; and wherein the access controller further determines a difference between the maximum received pilot strength information from a non-active base station not in connection with the mobile station and the maximum received pilot strength information from an active base station in connection with the mobile station and increases the data rate assigned to said requesting mobile station when the difference has a predetermined relationship to a predetermined threshold.

8. In a code division multiple access system including multiple cells, each cell having a base station and multiple mobile stations, a method of allocating bandwidth to a mobile station comprising the steps of:

receiving, at a base station of a first cell, a data burst request from a mobile station of said first cell requesting a first data rate in excess of the basic data rate B allocated to that mobile station, said data burst request including pilot strength information for the base station of said first cell and a base station of at least one cell adjacent to said first cell;

at an access controller, using the received pilot strength information to determine an increased data rate which is to be granted to said requesting mobile station without causing excessive interference at said first cell and said at least one adjacent cell;

transmitting a data burst assignment response from the access controller to said requesting mobile station indicating the increased data rate which has been granted to said requesting mobile station;

wherein the access controller compares the received pilot strength information with a threshold and wherein the increased data rate is assigned to said requesting mobile station when the received pilot strengths have a predetermined relationship to that threshold; and wherein the threshold decreases with increasing forward link load.

9. In a code division multiple access system including multiple cells, each cell having a base station and multiple mobile stations, a method of allocating bandwidth to a mobile station comprising the steps of:

receiving, at a base station of a first cell, a data burst request from a mobile station of said first cell requesting a first data rate in excess of the basic data rate B allocated to that mobile station, said data burst request including pilot strength information for the base station of said first cell and a base station of at least one cell adjacent to said first cell;

at an access controller, using the received pilot strength information to determine an increased data rate which is to be granted to said requesting mobile station without causing excessive interference at said first cell and said at least one adjacent cell;

transmitting a data burst assignment response from the access controller to said requesting mobile station indicating the increased data rate which has been granted to said requesting mobile station; and wherein the access controller further performs the steps of
determining a difference between the maximum received pilot strength information from a non-active base station not in connection with the mobile station and the sum of the received pilot strengths from active base stations in connection with the mobile station, comparing said difference with a threshold, and increasing the data rate assigned to said requesting mobile station when said difference has a predetermined relationship to that threshold.

10. A mobile station for use in a code division multiple access system, the mobile station comprising transmitter means sending a data burst request to a base station requesting a first data rate in excess of a basic data rate (B) allocated to that mobile station, the data burst request including pilot strength information of at least two pilot signals received by said mobile station from the base station and an adjacent or neighbor base station and receiver means, subsequent to the sending of the data burst request, receiving a data burst assignment indicating an increased data rate which has been granted to said mobile station, said increased data rate being based on the pilot strength information.

11. A method of operating a mobile station in a code division multiple access system, the method comprising the steps of:

transmitting a data burst request to a base station requesting a first data rate in excess of a basic data rate (B) allocated to that mobile station, the data burst request including pilot strength information of at least two pilot signals received by said mobile station from the base station and an adjacent or neighbor base station and receiving, in response to the transmitting step, a data burst assignment indicating an increased data rate which has been granted to said mobile station, said increased data rate being based on the pilot strength information.

12. The method of claim 11 further including the step of:

increasing the data rate at said mobile station gradually and autonomously.

13. The method of claim 11 wherein said mobile station reports its measured forward link load in the data burst request.

14. The method of claim 13 wherein the burst request signal includes data burst length information.

15. A base station for use in a code division multiple access system including multiple cells, each cell having a base station and multiple mobile stations, the base station comprising:

receiver means receiving a data burst request signal from a mobile station requesting a first data rate in excess of a basic data rate (B) allocated to that mobile station, the data burst request including pilot strength information of said base station and at least one other base station of an adjacent cell, means, using the received pilot strength information, for determining an increased data rate which is to be granted to said requesting mobile station without causing excessive interference at said base station and said at least one adjacent base station, and transmitter means sending a data burst assignment response to said requesting mobile station indicating the determined increased data rate granted to said requesting mobile station.

16. The base station of claim 15 wherein the increased data rate is granted when the received pilot strength information does not exceed a predetermined threshold.

17. A method of operating a base station for use in a code division multiple access system including multiple cells, each cell having a base station and multiple mobile stations, the method comprising the steps of:

receiving a data burst request signal from a mobile station requesting a first data rate in excess of a basic data rate (B) allocated to that mobile station, the data burst request including pilot strength information of said base station and at least one other base station of an adjacent cell, determining, in response to the received pilot strength information, an increased data rate which is to be granted to said requesting mobile station without causing excessive interference at said base station and said at least one adjacent base station, and transmitting a data burst assignment response to said requesting mobile station indicating the determined increased data rate granted to said requesting mobile station.

18. The method of claim 17 wherein the increased data rate is granted when the received pilot strength does not exceed a predetermined threshold.

19. The method of claim 17 further including the steps of:

checking a list of scheduled data bursts at said base station and wherein the data burst assignment response includes a retry later message when the list is longer than a predetermined length and a data burst permission message when the list is shorter than the predetermined length.

20. The method of claim 17 wherein a set of thresholds are associated with multiple data burst rates, and wherein said base station compares received pilot strength information, from said at least one other base station of an adjacent cell, with the set of thresholds to determine a data rate to be granted to said requesting mobile station.

21. The method of claim 17 wherein the data burst assignment response includes a data burst length parameter specifying a permitted length of a data burst to said requesting mobile station.

22. The method of claim 17 wherein the determining step includes the steps of:
   transmitting the data burst request to an access controller and
   receiving the data burst assignment for said requesting mobile from the access controller.

* * * * *